US009254636B2

(12) United States Patent
Price et al.

(10) Patent No.: US 9,254,636 B2
(45) Date of Patent: Feb. 9, 2016

(54) DISPLAY MODULE REWORKABILITY

(71) Applicant: Apple Inc., Cupertino, CA (US)

(72) Inventors: James A. Price, San Jose, CA (US); Jingtao He, Shanghai (CN)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 14/035,862

(22) Filed: Sep. 24, 2013

(65) Prior Publication Data

US 2015/0083340 A1   Mar. 26, 2015

(51) Int. Cl.
*B32B 38/10* (2006.01)
*B32B 43/00* (2006.01)
*B26D 1/547* (2006.01)
*B26F 3/06* (2006.01)

(52) U.S. Cl.
CPC .............. *B32B 43/006* (2013.01); *B26D 1/547* (2013.01); *B26F 3/06* (2013.01); *B32B 38/10* (2013.01); *B32B 2457/20* (2013.01); *Y10T 156/1184* (2015.01); *Y10T 156/1967* (2015.01)

(58) Field of Classification Search
CPC   B32B 38/10; B32B 43/006; Y10T 156/1184; Y10T 156/1967
USPC ............. 156/717, 762, 924; 83/136, 149, 152
See application file for complete search history.

(56) References Cited

U.S. PATENT DOCUMENTS

| 3,799,017 | A | 3/1974 | Halligan |
| 8,118,075 | B2 | 2/2012 | Sampica et al. |
| 8,141,611 | B2 | 3/2012 | Lai et al. |
| 8,152,947 | B2 * | 4/2012 | Toyoda et al. ................ 156/94 |
| 8,261,804 | B1 | 9/2012 | Huang |
| 8,349,129 | B2 * | 1/2013 | Blanchard et al. ............ 156/717 |
| 8,419,896 | B2 | 4/2013 | Ciliberti et al. |
| 2003/0121601 | A1 * | 7/2003 | Tajima ........................ 156/254 |
| 2003/0230381 | A1 * | 12/2003 | Watanabe ..................... 156/250 |
| 2007/0151667 | A1 | 7/2007 | Tani et al. |
| 2011/0180218 | A1 * | 7/2011 | Ciliberti et al. ............... 156/705 |

FOREIGN PATENT DOCUMENTS

| CN | 201247362 Y | 5/2009 |
| CN | 101990498 A | 3/2011 |
| CN | 103085116 A | 5/2013 |
| WO | WO2005070573 A1 | 8/2005 |
| WO | WO2010059906 A1 | 5/2010 |

OTHER PUBLICATIONS

Chinese Application for Invention No. 201410491413.4—First Office Action dated Oct. 30, 2015.

* cited by examiner

*Primary Examiner* — Mark A Osele
*Assistant Examiner* — Nickolas Harm
(74) *Attorney, Agent, or Firm* — Downey Brand LLP

(57) ABSTRACT

Techniques are disclosed for a cutting apparatus that can be used to cut a target layer within a display module, e.g., a liquid crystal display that includes a protective cover glass. The cutting apparatus includes a platform that supports a track. The cutting apparatus also includes a linear slide that is configured to both hold the display module in place and travel along the track, where the movement of the linear slide along the track is driven by a mass that is in free fall. The cutting apparatus further includes a cutting wire, where the cutting wire is positioned relative to the target layer and oscillates to cut the target layer as the linear slide moves along the track. Additional techniques are disclosed and directed toward a method for operating the cutting apparatus described above.

16 Claims, 6 Drawing Sheets

DISPLAY MODULE REWORKABILITY

TECHNICAL FIELD

This invention relates generally to display modules. In particular, embodiments of the invention relate to a technique for separating one or more layers within a display module.

BACKGROUND

The proliferation of mobile computing devices—such as laptops, smart phones, and tablets—has caused an evolution in the design, manufacture, and capabilities of liquid crystal displays (LCDs). As commonly known, conventional LCDs are comprised of several layers, which can include backlights, diffusers, polarizers, color filters, and, in some cases, a protective cover glass. Recently, however, manufacturers of LCDs have been supplementing the LCDs to include new layers—such as indium tin oxide (ITO) layers—that are conductive and transparent, and enable touch-input to be received and interpreted by mobile computing devices. In particular, these new layers are typically sandwiched between the protective cover glass and the other layers of the LCD to produce a display module that can both display content and receive touch input from a user.

Although advancements have been made to increase the durability of these display modules, they continue to remain highly susceptible to being damaged. For example, despite significant increases that have been made to the overall hardness and rigidity of protective cover glass layers, dropping a mobile computing device from even a few feet can result in the protective cover glass shattering. When this occurs, a user's view of content displayed by the display module can be obstructed—and in some cases can disrupt his or her touch input—thereby rendering the mobile computing device semi or completely inoperable. Notably, when repairing the device, the display module is often wholly discarded and replaced with an entirely new display module, which is unfortunate and wasteful considering that the LCD portion is, in most cases, still fully intact and operational.

SUMMARY

This paper describes various embodiments that set forth a cutting apparatus and a method for reliably and efficiently separating layers within a display module via a cutting wire. Notably, the configurations set forth herein provide various benefits, such as causing the rate at which the display module moves during the cutting process to naturally adjust (e.g., as harder layers are encountered by the cutting wire) without requiring the implementation of complex and unreliable force-feedback mechanisms. As a result, "drift" in a cutting wire is minimized, which increases the reliability of the cutting process. Moreover, the overall strain placed on the cutting wire is kept constant and within acceptable boundaries, which significantly decreases cutting wire breakage and increases operator safety.

One embodiment of the invention sets forth a cutting apparatus for cutting a target layer within a display module. The cutting apparatus includes a platform that supports a track. The cutting apparatus also includes a linear slide that is configured to both hold the display module in place and travel along the track, where the movement of the linear slide along the track is driven by a mass that is in free fall. The cutting apparatus further includes a cutting wire, where the cutting wire is positioned relative to the target layer and oscillates to cut the target layer as the linear slide moves along the track.

Another embodiment of the invention sets forth a method for cutting a target layer within a display module. The method includes the step of positioning and binding a display module onto a linear slide, where the linear slide is configured to move along a track and is driven by a mass that is in free fall. The method also includes the step of adjusting a height of a cutting wire so that the cutting wire is positioned at the target layer. The method further includes the step of causing the cutting wire to oscillate in order to cut the target layer within the display module.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements.

DETAILED DESCRIPTION

Figure 1A:
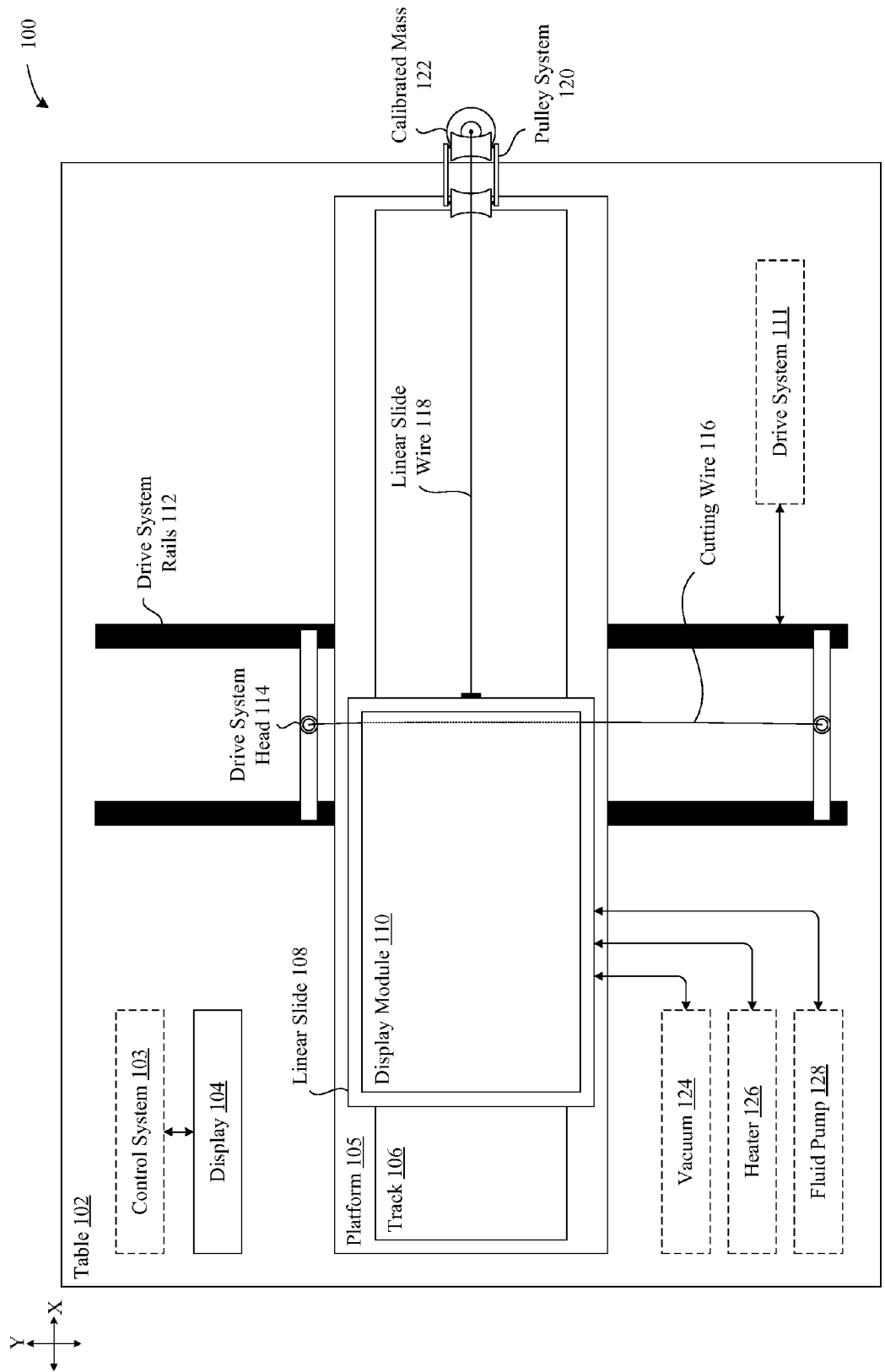
FIG. 1A illustrates a perspective view of a cutting apparatus configured to separate layers within a display module, according to one embodiment of the invention.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As described above, there exists a need for a method and apparatus for reliably and efficiently separating layers within a display module. This need is especially important considering that particular layers within a display module—such as the LCD layer within a touch-sensitive display module—constitutes a majority of the cost of the display module as a whole, yet remains partially or completely inoperable so long as, for example, the cover glass layer of the display module is damaged. Notably, one technique that is often used in attempt to separate the layers of the display module can involve prying the layers apart, but this is futile considering that most layers are quite fragile and susceptible to damage. One attempt to refine this process involves freezing the display module (e.g., using liquid nitrogen) so that adhesive layers included therein become brittle and break apart more easily as the layers are pried apart. Unfortunately, when executing the freezing process, it is quite difficult to prevent the cooling from spreading to the LCD layer within the display module, which can damage the LCD and render it inoperable.

Accordingly, embodiments of the invention set forth a cutting apparatus and a method for reliably and efficiently separating layers within a display module. As described in greater detail below, the cutting apparatus is designed to accept a display module and to cut a particular layer within the display module via an oscillating cutting wire. In particular, the display module is positioned and bound to a linear slide that is driven by a calibrated mass that is hanging in free fall. This causes the linear slide (and therefore the display module) to move along as the cutting wire oscillates and cuts a targeted layer within the display module. Notably, this configuration provides various benefits, such as causing the rate at which the display module moves to naturally adjust (e.g., as harder layers are encountered by the cutting wire), as opposed to necessitating the implementation of complex and unreliable force-feedback mechanisms. As a result, "drift" in the cutting wire is minimized, which increases the reliability of the cutting process. Moreover, the overall strain placed on the cutting wire is kept constant and within acceptable boundaries, which significantly decreases cutting wire breakage and increases operator safety.

FIG. 1A illustrates a perspective view of a cutting apparatus 100 configured to separate layers within a display module 110, according to one embodiment of the invention. As shown in FIG. 1A, the cutting apparatus 100 includes a table 102 that is configure to support the various components illustrated within the boundaries of the table 102. According to one embodiment, the cutting apparatus 100 includes a platform 105, which, as shown in FIG. 1A, is configured to support a track 106 on which a linear slide 108 can travel. In particular, the linear slide 108 is configured to support the display module 110 at a particular height, such that the height of a cutting wire 116 can be slightly adjusted to a height that targets a particular layer within the display module 110. In particular, and as described in greater detail below, the linear slide 108—and the display module 110—are configured to travel along the track 106, where the cutting wire 116 oscillates back and forth to cause the display module 110 to separate at the targeted layer within the display module 110. The cutting wire 116 can be implemented in a variety of manners, e.g., a stainless steel cylindrical wire coated in diamond dust.

Figure 2:
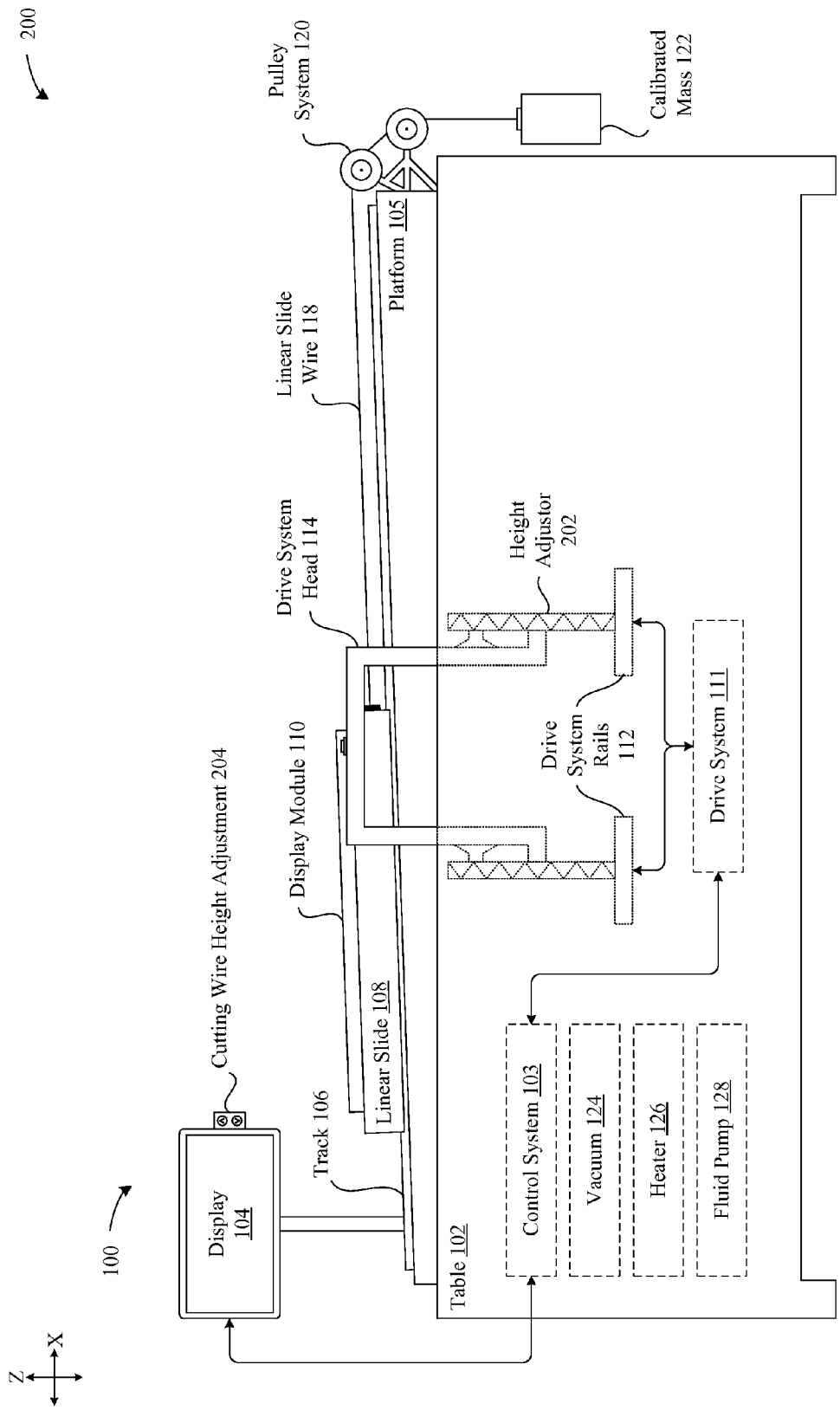
FIG. 2 illustrates another perspective view of the cutting apparatus of FIG. 1A, according to one embodiment of the invention.

According to one embodiment, and as made clearer by FIG. 2, the platform 105 can be a planar surface that is inclined at a particular angle, which, in turn, causes both the track 106 and the linear slide 108 to be oriented and travel, respectively, at the particular angle on the platform 105—e.g., between two to six degrees (although other ranges may be used). This angle provides a variety of benefits, which, as described in greater detail below, include enabling a lubricating fluid to travel, via the capillary effect, within the targeted layer of the display module 110 as it is being cut by the cutting wire 116. As a result, the cutting process is smoothed and the amount of stress placed on the cutting wire 116 is reduced, thereby increasing the overall performance of the cutting apparatus 100.

As noted above, the linear slide 108 is configured to travel along the track 106. In one embodiment, and as illustrated in FIG. 1A, the force that drives the linear slide 108 along the track 106 involves a linear slide wire 118, a pulley system 120, and a calibrated mass 122. In particular, and as also made clearer by FIG. 2, the calibrated mass 122 is configured to hang in free fall in order to establish tension in the linear slide wire 118 via the pulley system 120, thereby causing the linear slide 108 to move in a direction toward the pulley system 120 (along the x-axis labeled in FIG. 1A). In turn, and as described above, the display module 110 is cut at the targeted layer via the cutting wire 116 as the cutting wire 116 oscillates (along the y-axis labeled in FIG. 1A), which, as described below, is configured to remain static along both the x-axis and the z-axis labeled in FIG. 2. The rate at which the cutting wire 116 oscillates can be adjusted based on a variety of factors, e.g., the type of material being cut. Moreover, the standing positions of the drive system heads 114 along the y-axis labeled in FIG. 1A can be adjusted to strengthen or loosen the tension of the cutting wire 116 (e.g., to adjust for new materials, different cutting wire 116 strengths, etc.).

In one embodiment, the cutting wire 116 is attached to and driven by two drive system heads 114, which oscillate along the y-axis labeled in FIG. 1A via drive system rails 112. According to one embodiment, the drive system heads 114 are controlled by a drive system 111, which can include a component (e.g., a screw jack) that causes the drive system heads 114 to oscillate on the drive system rails 112. The drive system 111 can also include a component that causes the drive system heads 114 to vary in height so that the cutting wire 116 can be properly aligned with a targeted layer within the display module 110, which is illustrated in greater detail in FIG. 3.

FIG. 1A also illustrates additional components that can be included in the cutting apparatus 100 to facilitate the separation of the display module 110 at a target layer. In particular, the cutting apparatus 100 can include a control system 103, where the control system 103 can be configured to control the overall operation of the cutting apparatus 100 and display relevant information via a display 104 (e.g., an LCD computer monitor). For example, the control system 103 can be used to control the various features of the drive system 111 described above, and can further be configured to control a vacuum 124, a heater 126, and a fluid pump 128, which can also be included in the cutting apparatus 100. Specifically, the vacuum 124 can be connected to the linear slide 108 and provide suction against the display module 110 such that the display module 110 remains stationary on the linear slide 108 as the cutting process is carried out. The heater 126 can also be connected to the linear slide 108 and to provide heat (e.g., between fifty to fifty five degrees Celsius) to cause, via conductive heating, the adhesive layers within the display module 110 to ease the cutting process as it is carried out. Finally, the fluid pump 128 can also be included to house a lubricating fluid (e.g., deionized water, fluorenol, etc.) and pump the fluid into appropriate areas of the display module 110 as the cutting process is carried out.

Figure 1B:
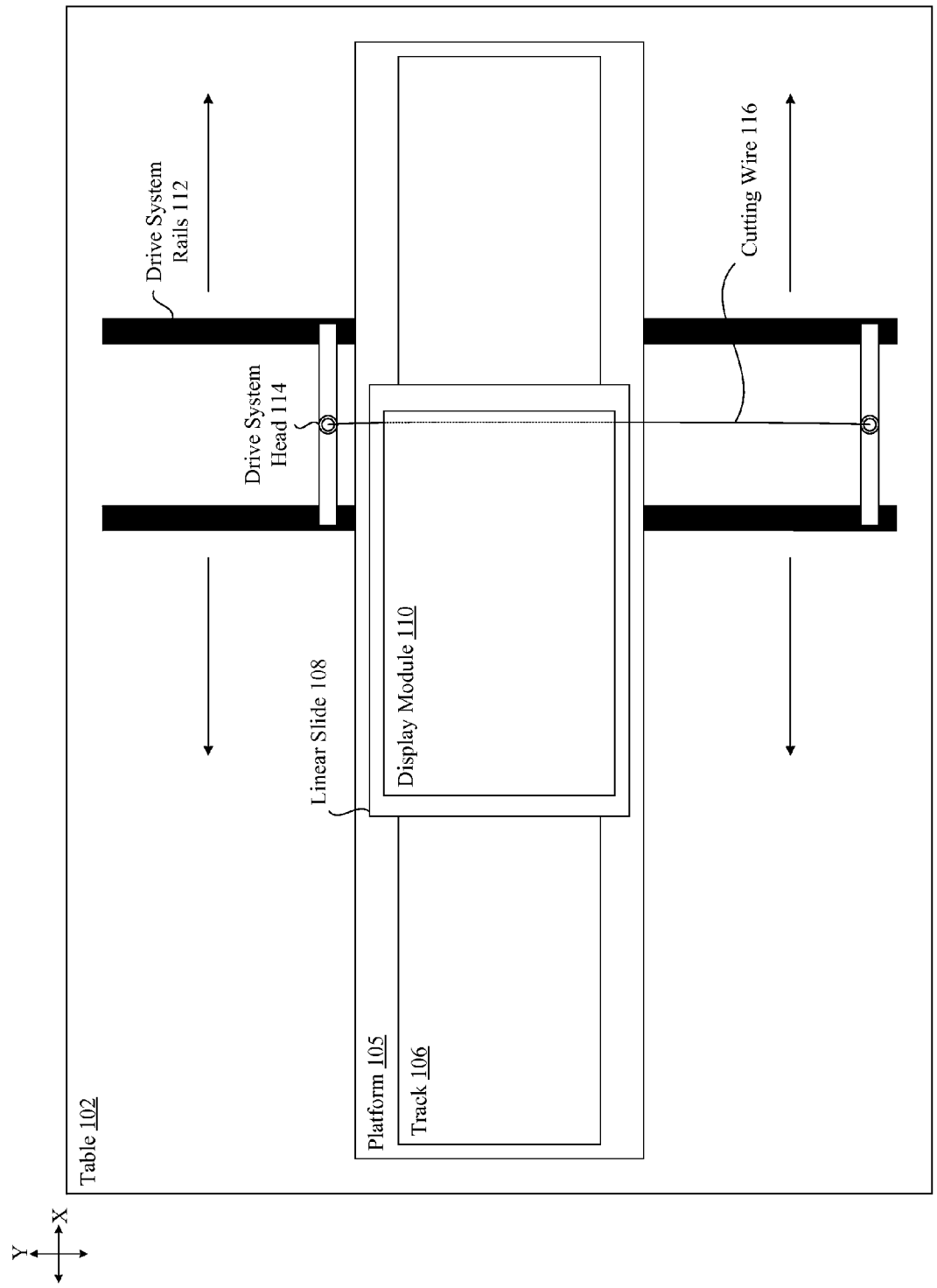
FIG. 1B illustrates a perspective view of an alternative cutting apparatus configured to separate layers within a display module, according to one embodiment of the invention.

Notably, although the cutting apparatus 100 illustrated in FIG. 1A is directed toward a technique that involves the display module 110 remaining stationary along the y-axis and moving along the x-axis while the cutting wire 116 oscillates along the y-axis labeled in FIG. 1A, other configurations can be used to achieve the same or similar cutting effects described herein. For example, FIG. 1B illustrates an alternative cutting apparatus 101, where the drive system rails 112—as well as the drive system heads 114 and the cutting wire 116—are configured to move along the x-axis labeled in FIG. 1B (e.g., via additional drive system rails or other means). According to this approach, the drive system heads 114 oscillate along the y-axis and move along the x-axis labeled in FIG. 1B such that the linear slide 108 and the display module 110 remain stationary along the x-axis and the y-axis as the cutting process is carried out. Moreover, the cutting wire 116 is not limited to oscillating back and forth along the y-axis; instead, different approaches may be used, such as a cutting wire that is a loop and is continuously rotated (e.g., a band-saw like approach).

FIG. 2 illustrates a perspective view 200 of the cutting apparatus 100 of FIG. 1A, according to one embodiment of the invention. In particular, FIG. 2 depicts the angle at which the platform 105 is inclined to cause the track 106, the linear slide 108, and the display module 110 to travel upward as the cutting process is carried out. Again, this angle provides the benefit of assisting a lubricating fluid in traveling, via the capillary effect, within the targeted layer of the display module 110 as it is being cut by the cutting wire 116. FIG. 2 also depicts the manner in which the calibrated mass 122 is configured to hang in free fall to establish tension in the linear slide wire 118 via the pulley system 120—which, again, causes the linear slide 108 to move in a direction toward the pulley system 120 (along the x-axis labeled in FIG. 2).

Notably, the technique of placing the calibrated mass 122 in free fall provides an answer to several issues that can occur as the cutting process is executed. For example, in some cases, the cutting wire 116 can be adjusted to cut an adhesive layer whose hardness varies throughout the length of the display module 110 (e.g., the adhesive layer may have cured in a non-uniform manner, or may be heated by the heater 126 in a non-uniform manner). When this occurs, the movement of the linear slide 108 along the track 106 is naturally slowed down when harder portions of the adhesive layer are being cut by the cutting wire 116. This can provide a variety of benefits, including reducing the amount of heat produced by the cutting wire 116, and reducing the likelihood of the cutting wire 116 breaking. In contrast, if the calibrated mass 122 solution were replaced with, for example, an electric motor configured to spin at a continuous rate, the display module 110 would move at a constant rate regardless of the progress of the cutting wire 116 as it encounters different levels of hardness within the layer that is being cut. To alleviate this problem, more complicated features could be introduced, such as a feedback system that slows the spin rate of the electric motor based on a variety of factors (e.g., measuring resistance against the cutting wire, measuring tugging in the linear slide wire 118, etc.), but this would increase the overall cost and complexity of the cutting apparatus 100.

Also illustrated in FIG. 2 are additional components not illustrated in FIG. 1A, which include height adjustors 202 and cutting wire height adjustments 204. As shown in FIG. 2, the height adjustors 202 are configured to adjust the height of the drive system heads 114 so that the cutting wire 116 attached thereto can be positioned at an appropriate height (along the z-axis labeled in FIG. 2) to target a particular layer to cut within the display module 110. The height adjustors 202 can be implemented according to a variety of techniques, e.g., a screw conveyor, as depicted in FIG. 2. As noted above, the cutting apparatus 100 can also include cutting wire height adjustments 204, which are configured to control the height of the drive system heads 114 along the z-axis labeled in FIG. 2. The cutting wire height adjustments 204 can be implemented according to a variety of techniques, including using physical buttons as depicted in FIG. 2. Notably, the cutting wire height adjustments 204 can be used to independently vary the heights of the drive system heads 114, e.g., to ensure that the cutting wire 116 is level across the targeted layer to be cut.

Figure 3:
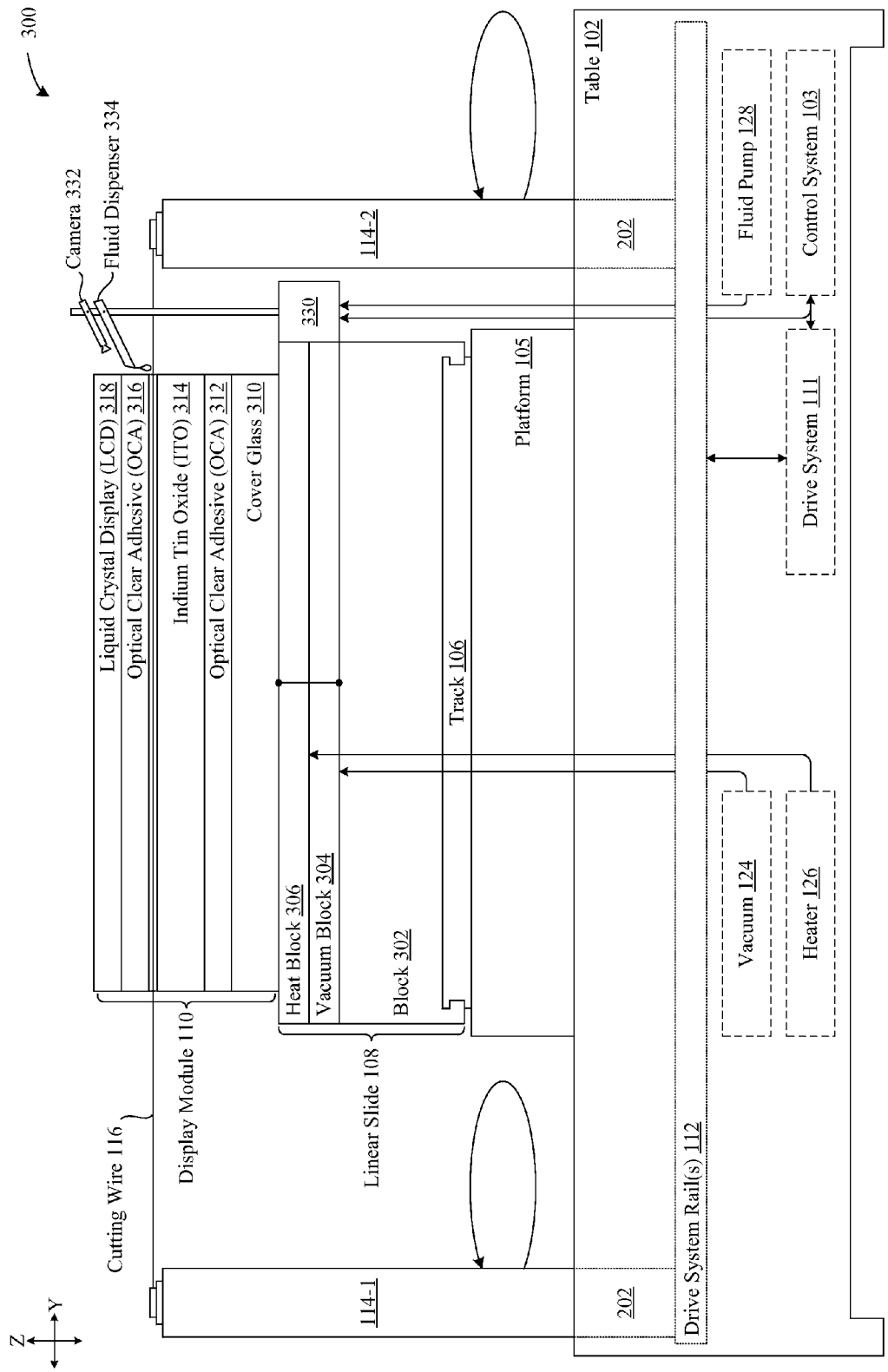
FIG. 3 illustrates yet another perspective view of the cutting apparatus of FIG. 1A, according to one embodiment of the invention.

FIG. 3 illustrates yet another perspective view 300 of the cutting apparatus 100 of FIG. 1A, according to one embodiment of the invention. In particular, FIG. 3 shows additional components not illustrated in FIGS. 1 and 2, which include both a detailed breakdown of the linear slide 108 and a detailed breakdown of the display module 110. As shown in FIG. 3, and according to one embodiment, the linear slide 108 is made up of a block 302, a vacuum block 304, a heat block 306, and a module 330. Specifically, the block 302 is configured to bind to the track 106 such that the linear slide 108 smoothly moves along the track 106 while the cutting process is being executed. As noted above, the linear slide 108 also includes a vacuum block 304, which is driven by the vacuum 124 and serves as a means to pull the display module 110 downward and lock the display module 110 into place so that it does not move while the cutting process is being executed. Moreover, the heat block 306, which is driven by the heater 126, serves as a means to heat the display module 110 to a particular temperature in order to reduce the amount of strain that the cutting wire 116 undergoes during the cutting process. It is noted that the order of these components can be reoriented and that the invention is not limited to the illustration of FIG. 3.

Also illustrated in FIG. 3 is a breakdown of an exemplary display module 110, which includes a cover glass layer 310, a first optical clear adhesive (OCA) layer 312, an ITO layer 314, a second OCA layer 316, and an LCD layer 318. As shown in FIG. 3, the OCA layers 312 and 316 adhere the various layers of the display module 110 to one another such that the display module 110 can display content via the LCD layer 318 and receive touch input via the ITO layer 314. According to this example, the heat block 306 causes the OCA layer 316 (as well as the OCA layer 312) to soften in order to lessen the overall hardness of material through which the cutting wire 116 is directed to cut (e.g., when the OCA layer 316 is targeted). Again, targeting the OCA layer 316 enables the LCD layer 318 to be separated out from the display module 110 after the cutting process is executed, which is beneficial considering the LCD layer 318 is often still intact even when the cover glass layer 310 is damaged.

In one embodiment, the linear slide 108 also includes a module 330 that is configured to support both a camera 332 and a fluid dispenser 334. According to one embodiment, the camera 332 is tied into the control system 103 and can be used to zoom in on the layers of the display module 110. This configuration can enable a high-resolution image of the layers within the display module 110 to be distinguished (e.g., via the display 104) so that the cutting wire 116 can be positioned at a proper height along the z-axis labeled in FIG. 3. Moreover, the fluid dispenser 334 is tied into the fluid pump 128 and is adjustable so that lubricating fluid can be applied to the appropriate area of the display module 110 to lubricate the cutting wire 116 as the cutting process is carried out. It is noted, however, that the camera 332 and fluid dispenser 334 are not required for the cutting process to be executed, e.g., an operator could manually identify the appropriate height for the cutting wire 116 and apply lubricating fluid as needed while the cutting process is executed.

Figure 4:
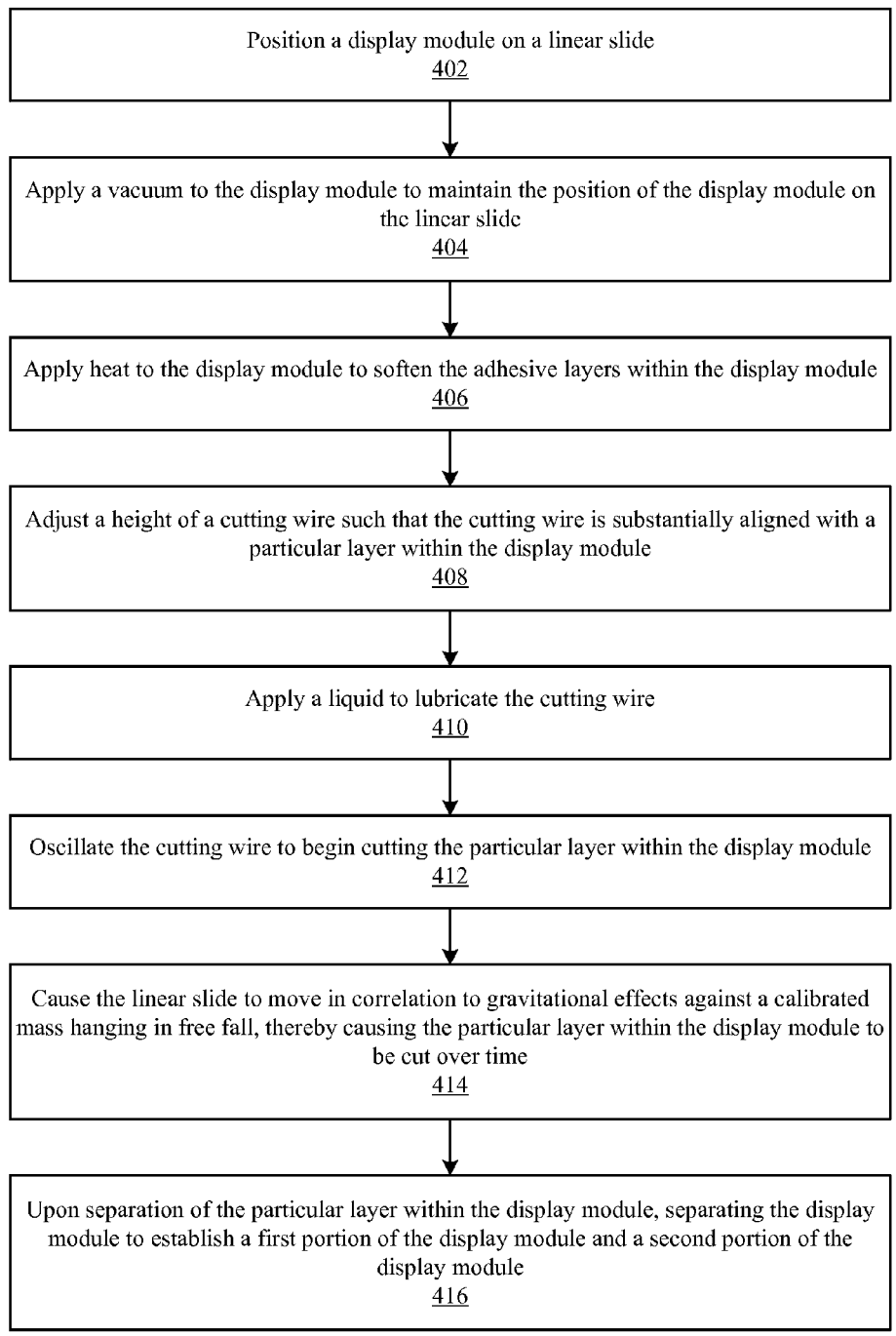
FIG. 4 illustrates a method for separating layers within a display module using the cutting apparatus of FIG. 1A, according to one embodiment of the invention.

FIG. 4 illustrates a method 400 for separating layers within a display module using the cutting apparatus 100 of FIG. 1A, according to one embodiment of the invention. As shown, the method 400 begins at step 402, which involves positioning the display module 110 on the linear slide 108 (e.g., as illustrated in FIGS. 1, 2, and 3). Step 404 involves applying a vacuum (via the vacuum 124 and the vacuum block 304) to the display module 110 to maintain the position of the display module 110 on the linear slide 108.

Step 406 involves applying heat (via the heater 126 and the heat block 306) to the display module 110 to soften the adhesive layers (e.g., the OCA layer 316 and the OCA layer 312) within the display module 110. Step 408 involves adjusting a height of the cutting wire 116 such that the cutting wire 116 is substantially aligned with a particular layer within the display module 110. For example, if the display module 110 is composed of the layers illustrated in FIG. 3, then the OCA layer 316 can be targeted to separate the LCD layer 318 out from the display module 110. Notably, in instances where the ITO layer 314 is included, the height of the cutting wire 116 can be biased toward the ITO layer 314 to help reduce the likelihood of the LCD layer 318 from becoming damaged in the event that the cutting wire 116 drifts upward while the cutting process is being executed.

Step 410 involves applying a liquid (via the fluid pump 128 and the fluid dispenser 334) to lubricate the cutting wire 116. Step 412 involves oscillating the cutting wire 116 to begin cutting the particular layer within the display module 110. Step 414 involves causing the linear slide 108 to move in correlation to gravitational effects against the calibrated mass 122 hanging in free fall, thereby causing the particular layer within the display module 110 to be cut over time. This can involve, for example, releasing a lock mechanism that transitions the calibrated mass 122 from being in a held position to being in a free fall position. Step 416 involves, upon separation of the particular layer within the display module, separating the display module to establish a first portion of the display module and a second portion of the display module. As previously noted herein, at least one of the first portion and the second portion includes a salvageable component (e.g., the LCD layer 318) that can be extracted. The method 400 can additionally include a step (not illustrated in FIG. 4) that involves isolating the portion of the display module that is to be salvaged and applying a cleaning solution (e.g., ethanol) to remove any additional residue (e.g., OCA layer 316/ITO layer 314 dust and/or fragments).

Figure 5:
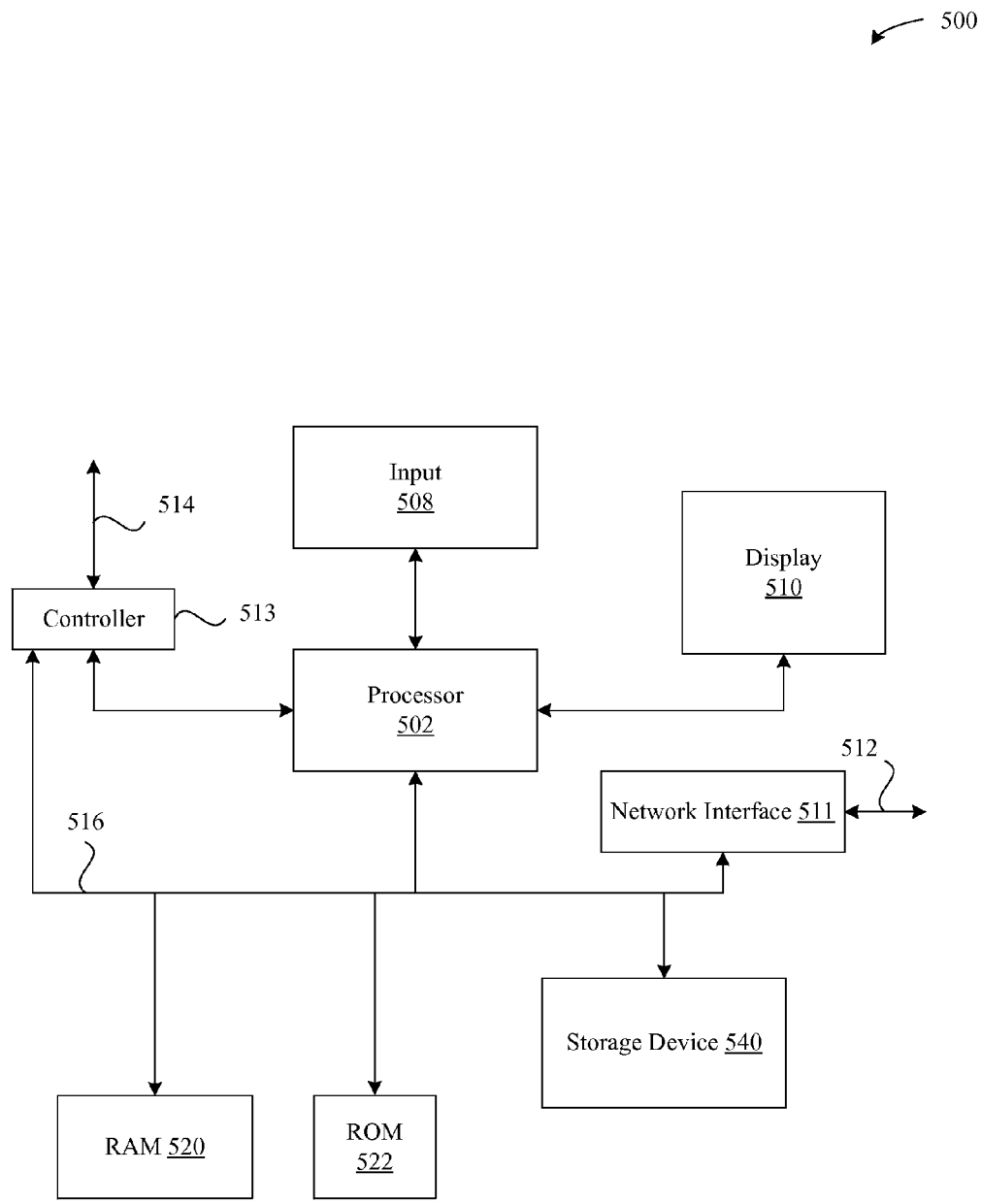
FIG. 5 illustrates a computer system that can be used to control various aspects of the operation of the cutting apparatus of FIG. 1A, according to one embodiment of the invention.

FIG. 5 illustrates a computing device 500 (e.g., the control system 103) that can be used to control various aspects of the operation of the cutting apparatus 100 of FIG. 1A, according to one embodiment of the invention. As shown in FIG. 5, the computing device 500 can include a processor 502 that represents a microprocessor or controller for controlling the overall operation of computing device 500. The computing device 500 can also include user input device 508 that allows a user of the computing device 500 to interact with the computing device 500. For example, user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by processor 502 to display information to the user. Data bus 516 can facilitate data transfer between at least storage devices 540, processor 502, and controller 513. Controller 513 can be used to interface with and control different equipment through equipment control bus 514. The computing device 500 can also include a network/bus interface 511 that couples to data link 512. Data link 512 can allow the computing device 500 to couple to a host computer or to accessory devices. The data link 512 can be provided over a wired connection or a wireless connection. In the case of a wireless connection, network/bus interface 511 can include a wireless transceiver.

The computing device 500 also includes storage devices 540, which can comprise a single disk or a plurality of disks (e.g., hard drives). In some embodiments, storage devices 540 can include flash memory, semiconductor (solid state) memory or the like. The computing device 500 can also include Random Access Memory (RAM) 520 and Read-Only Memory (ROM) 522. The ROM 522 can store programs, utilities or processes to be executed in a non-volatile manner. The RAM 520 can provide volatile data storage, and stores instructions related to the various components that are configured to carry out the various techniques described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A cutting apparatus for cutting a target layer within a display module, the cutting apparatus comprising:
   a platform that supports a track;
   a linear slide configured to hold the display module in place and travel along the track;
   a mass coupled to the linear slide, wherein the mass is in free fall and drives a movement of the linear slide;
   a cutting wire that oscillates to horizontally cut the target layer as the linear slide moves along the track.

2. The cutting apparatus of claim 1, wherein both the platform and track are inclined at a same continuous angle such that the linear slide and the display module travel at the continuous angle as the cutting wire cuts the target layer.

3. The cutting apparatus of claim 1, wherein the linear slide includes a heating block that causes, via conductive heat, the target layer to soften.

4. The cutting apparatus of claim 1, wherein the linear slide includes a vacuum block that causes the display module to be held in place against the linear slide as the linear slide travels along the track and the target layer is cut.

5. The cutting apparatus of claim 1, wherein a height of the cutting wire is adjustable so that different layers within the display module can be targeted to be cut via the cutting wire.

6. The cutting apparatus of claim 5, further comprising:
   a camera that is positioned to enable the target layer to be identified;

a display monitor for displaying an output of the camera; and a height adjustment controller that enables the height of the cutting wire to be varied.

7. The cutting apparatus of claim 6, wherein the cutting wire has a first end and a second end, the first end being bound to a first drive system head and the second end being bound to a second drive system head.

8. The cutting apparatus of claim 7, wherein a height of each of the first drive system head and the second drive system head can be independently adjusted via the height adjustment controller.

9. The cutting apparatus of claim 7, wherein the first drive system head and the second drive system head can be adjusted to strengthen or loosen a tension of the cutting wire.

10. The cutting apparatus of claim 7, wherein a distance between the first drive system head and the second drive system head remains constant as they move to cause the cutting wire to oscillate.

11. The cutting apparatus of claim 10, wherein a rate at which the cutting wire oscillates is adjustable.

12. The cutting apparatus of claim 1, further comprising:
a fluid pump; and
a fluid dispenser configured to dispense a fluid that lubricates the cutting wire as the target layer is cut.

13. The cutting apparatus of claim 1, wherein the cutting wire is composed of cylindrical steel and is reinforced with diamond dust.

14. The cutting apparatus of claim 1, wherein the linear slide and the mass are tethered to one another via a wire and at least one pulley.

15. The cutting apparatus of claim 1, further comprising:
a locking mechanism that causes the mass to transition from a locked position into a free fall position.

16. The cutting apparatus of claim 1, wherein the display module includes at least a liquid crystal display (LCD) and a cover glass, and the cover glass is bound to the LCD via an adhesive layer that is the target layer.

* * * * *